United States Patent [19]

Norville

[11] Patent Number: 5,407,615
[45] Date of Patent: Apr. 18, 1995

[54] COMPOSITIONS AND METHODS FOR REPAIRING AND REMOVING SCRATCHES AND OTHER IMPERFECTIONS FROM PLASTIC SURFACES

[75] Inventor: William C. Norville, Park City, Utah

[73] Assignee: Clearfix Corporation, New York, N.Y.

[21] Appl. No.: 139,575

[22] Filed: Oct. 19, 1993

Related U.S. Application Data

[63] Continuation-in-part of Ser. No. 962,887, Oct. 19, 1992, Pat. No. 5,334,335.

[51] Int. Cl.⁶ .......................... B24D 3/02; B32B 35/00
[52] U.S. Cl. ........................................ 264/36; 51/308; 51/309; 264/341
[58] Field of Search ............... 264/36, 162, 293, 341; 51/308, 309

[56] References Cited

U.S. PATENT DOCUMENTS

| | | | |
|---|---|---|---|
| 2,921,839 | 1/1960 | Ritter | 23/182 |
| 3,446,890 | 5/1969 | Emery et al. | 264/341 |
| 3,663,255 | 5/1972 | Vivian | 106/285 |
| 3,684,553 | 8/1972 | Van Dyk . | |
| 3,729,331 | 4/1973 | Vivian | 264/341 |
| 3,737,499 | 6/1973 | Kamena | 264/341 |
| 3,807,054 | 4/1974 | Joseph et al. | 34/73 |
| 3,904,732 | 9/1975 | Wick et al. . | |
| 3,933,518 | 1/1976 | Vivian | 106/311 |
| 4,181,633 | 1/1980 | Colodney et al. . | |
| 4,231,827 | 11/1980 | Wilson et al. | 156/214 |
| 4,247,580 | 1/1981 | Chao | 427/140 |
| 4,301,193 | 11/1981 | Zuk . | |
| 4,361,527 | 11/1982 | Rau . | |
| 4,544,578 | 10/1985 | Duane, Jr. . | |
| 4,952,240 | 8/1990 | Smith . | |
| 4,956,015 | 9/1990 | Okajima et al. . | |
| 5,007,128 | 4/1991 | Englund et al. . | |
| 5,137,541 | 8/1992 | Foster . | |

*Primary Examiner*—Karen Aftergut
*Attorney, Agent, or Firm*—Workman, Nydegger & Seeley

[57] ABSTRACT

Polishing compositions and methods are described for removing scratches and other imperfections from a variety of plastic surfaces in order to improve the clarity and optical quality. Such polishing compositions include a blend of suspension agents, at least one suspension agent having thixotropic qualities and at least one suspension agent having constant viscosity; solid abrasive material; water; and a lubricant. The compositions also preferably include a surfactant. The polishing compositions are applied by means of pads made from a variety of materials, including open-cell polyurethane or polyester, fleece wool, cotton, or other synthetic materials. The compositions are applied by hand or by means of a hand-held rotary, orbital, or oscillating machines, with fixed or variable speeds, and are also compatible with existing scratch removal machines, such as robotic machines.

48 Claims, No Drawings

COMPOSITIONS AND METHODS FOR REPAIRING AND REMOVING SCRATCHES AND OTHER IMPERFECTIONS FROM PLASTIC SURFACES

RELATED APPLICATIONS

This application is a continuation-in-part application of U.S. application Ser. No. 07/962,887, filed on Oct. 19, 1992, now U.S. Pat. No. 5,334,335, for inventor William C. Norville for Compositions and Methods for Repairing and Removing Scratches and Other Imperfections from Plastic Surfaces (incorporated herein by reference).

BACKGROUND

The Field of the Invention

The present invention relates to compounds and methods for removing scratches and other imperfections in the surface of plastics. More particularly, the present invention is directed to compounds, and methods for using the same, which can remove scratches and other defects from the surface of plastics in order to improve the optical quality of the plastic in the situation where plastics have become scratched, or otherwise opaque or semi-opaque because of physical, chemical or light damage.

Review of the Prior Art

In recent years, plastics have been used increasingly in place of glass as a cover or surface of choice for many applications such as watch faces, windows and table surfaces. The advantage of using plastic is that it is more lightweight, less brittle, stronger, and far less likely to break than glass. However, one of the drawbacks of using plastic is that its surface is not nearly as hard as glass. Consequently, it is much more prone to being scratched by hard objects or debris, such as metal, glass, sand, grit, or any other abrasive material.

In addition, plastics are more prone to hazing or surface yellowing due to weathering, which is often caused by oxidation or the influence of ultra-violet light from the sun. Such discoloration also can occur through ordinary cleaning of the plastic surfaces. Not surprisingly, while the surface of glass might remain clear for many years, plastic often becomes clouded, yellowed or otherwise opaque through oxidation and by other corrosive forces found in nature.

Plastic is the material of choice for making motorcycle windshields and airplane or jet windows, all of which must withstand high wind forces and pressure differentials. However, due to such high speed winds, damage to the windshields and windows is very likely.

Of particular concern is in the field of aviation and more particularly, in the area of airplane windows. Anyone who has ever flown in an aircraft, large or small, either as a passenger or a pilot, has undoubtedly noticed that the windows are often scratched, yellowed, or otherwise partially opaque. Besides being merely bothersome to the passenger, such damage can also severely impair the ability of the pilot to see the landscape outside the plane, creating a danger to all aboard. However, the discomfort and negative feeling such window damage can cause to passengers should not be overlooked.

Four airline companies, American Airlines, Delta Airlines, United Airlines and Sky West Airlines, conducted a customer survey and found that the customers' single greatest complaint concerned damage to the planes' windows, and more specifically, that the windows were so scratched that the customers could hardly see through them much of the time. The survey showed that some of the customers surveyed drew a psychological correlation between the poor condition of the windows and the level of maintenance of the rest of the plane. Another specific and related complaint involved customers who wished to take photographs of the scenery below through the windows, but who were unable to do so due to the poor condition of the windows.

While the scratched windows pose no real safety risk to the airline passengers, customer satisfaction and enjoyment is key to any business venture including that of common carriers like airlines.

In addition to commercial aircraft (of which there are some 13,000 in the United States alone) there are approximately 250,000 private planes in the United States and approximately 15,000 helicopters. Although the price of replacing the windows of these aircraft may vary according to the size, shape and materials in the window, it costs approximately $75,000 to completely replace the windows of a typical Lear 25-D jet.

In the military arena, where clarity of vision is a top priority, there are tens of thousands of aircraft. In the Gulf War alone there were 1,700 U.S. military planes in action, many of which experienced window damage as a result of the high speed, low level flying in the sandy conditions of the Arabian deserts, or when simply sitting on the runway and being exposed to blowing sand. The cost to replace the canopies of various military fighter planes and bombers is in the neighborhood of between about $20,000 to about $80,000 per aircraft.

Currently, technology exists to remedy the problem of scratching, hazing, and oxidation of plastic surfaces, particularly aircraft windows, but it is prohibitively expensive, requiring large amounts of both capital and labor. The current best method of scratch removal involves the use of a robotic polishing machine, a machine which typically ranges in cost from $500,000 to $1,500,000. Another drawback, in addition to the cost of initial investment, is that this machine can only polish the windows after they have been removed from the plane, which is a very time-consuming and labor-intensive process. It also usually requires the removal of several thousandths of an inch of the window surface to adequately remove the deeper scratches. This removal of material presents a problem under safety regulations which establish minimum thicknesses. Often, much of the plane's interior must be disassembled. Yet another factor is that the machine can only polish four windows per hour, and it requires two employees to operate. In addition to the high costs of both machine and labor, there is also the cost of the chemicals and other materials required to effectuate the window polishing.

Another cost which must be considered is the "down time" required to pull the entire aircraft apart in order to remove the windows, polish them, and then reassemble them into the aircraft. Most commercial aircraft have more than 150 windows, and it is not uncommon to take from between six and eight days to remove and polish every window of each plane. Consequently, most airlines have chosen to forego this process as evidenced by the generally poor condition of commercial airline windows. In addition to the expensive robotic polishing machine method set forth above, another sanding system called Micro-Mesh TM has been used to remove the scratches of plastics. The Micro-Mesh TM sanding system (a product of Micro-Surface Finishing Products, Inc. of Wilton, Iowa) uses a series of rubber-backed sanding cloths with differing sizes of grit. The first step uses a sanding cloth having 2,400 gauge grit. In subsequent steps, sanding clothes of finer grades up to 12,000 gauge grit are used. In addition to using the rubber sanding block, a small amount of antistatic cream is applied after polishing is complete.

The drawbacks of using the Micro-Mesh TM system, as well as the robotic system as presently used, is that a large amount of plastic must be sanded away in order to remove even the tiniest of scratches. In addition, a sizable area of plastic must be removed in order to avoid causing optical distortion of the plastic in the surrounding area where the scratch was removed. Another problem of the Micro-Mesh TM sanding system is the large amount of time it takes to perform each of the series of sandings for each type of grit.

What these two systems (robotic polishing and Micro-Mesh TM sanding) have in common is that in order to remove a scratch from the surface of the plastic, it is necessary to remove enough of the plastic surface to at least equal the depth of the scratch, and in most cases even more. To avoid optical distortion, the person performing the scratch-removing operation must possess a high level of skill and patience, which requires a high amount of training. Moreover, repeated scratch removals using these systems will greatly reduce the thickness of the plastic and destroy its desired protective properties. Reduced thickness can cause a window to fail airworthiness standards.

The Air Force has reported that because many windshields are manufactured to meet strict optics requirements, any removal of plastic or acrylic material during scratch removal can alter their optical qualities. In such cases, present scratch removal systems are essentially useless because in curing one problem (scratches) they create another (optical distortion).

In addition to airplane windows, there are hundreds of other applications which require clear, highly visual plastics, but where good visibility is often hindered because of scratches, oxidation and other opaqueness due to environmental influences. For example, schools around the country are switching from glass windows to windows made of Lexan TM, a product of General Electric Corp., in order to make them vandal-proof. Transit districts and schools around the country are switching from glass to plastic windows in their buses for the same reasons. In addition, new federal mandates now require trains to change all of their windows to plastic in order to make them more safe. Motorcycle windows are typically made of plexiglass, which is not glass, but a type of polymeric plastic. Ski enthusiasts are often disappointed when their gondola or tram is badly hazed or scratched, preventing the full breath-taking view they come to expect. Similarly, golfer's like a clear view from their golf carts.

Other common uses for plastic materials are watch crystals, gauge faces, eyeglasses, goggles, and laser discs, such as audio compact discs, picture discs, video laser discs and computer CD ROM and RAM disks. No practical methods are available for removing scratches from these surfaces at reasonable cost.

BRIEF SUMMARY AND OBJECTS OF THE INVENTION

An object of the present invention is the development of polishing compounds and methods for removing scratches, hazing, and discoloring of plastic surfaces which can be easily used or employed by lay individuals without having to train the individuals to use complicated equipment and machinery.

Another object of the present invention is the development of polishing compounds and methods for removing scratches, hazing, and discoloring of plastic surfaces which can be used for any of a variety of plastic surface restorations at a low cost and with a minimum of effort compared to any of the commercially available prior art methods.

Yet another object of the present invention is the development of novel polishing compounds and methods which can remove scratches in plastic surfaces without also requiring the removal of the surrounding plastic surface in an amount equal to the depth of the scratch.

A further object of the present invention is the development of novel polishing compounds and methods for removing scratches, hazing, and discoloring of plastic surfaces without causing optical distortion from excessive removal of the plastic surface during polishing.

Yet another object and feature of the present invention is the development of novel polishing compounds and methods for removing scratches, hazing and discoloration of aircraft windows wherein the windows do not have to be removed from the plane for the polishing procedure.

Yet a further object of the present invention is the development of novel polishing compositions and methods for removing scratches, hazing or discoloration which does not require removal of a substantial thickness of plastic.

A further object and feature of the present invention is the development of novel polishing compounds and methods for removing scratches, hazing, and discoloration in plastic surfaces, wherein the amount of volatile organic compounds in the formulations is limited or eliminated.

These and other objects of the present invention will become more fully apparent from the following description and appended claims, or may be learned by the practice of the invention.

To achieve the foregoing objects, and in accordance with the invention as embodied and broadly described herein, the present invention comprises novel compositions and methods for removing scratches and other imperfections in the surface of plastics such as hazing or yellowing. It has been found that such imperfections or flaws in the surface of the plastic can be removed by applying to the plastic surface polishing compositions described herein, which generally comprise an abrasive or blend of abrasives suspended in a solution of water and suspension agents. A surfactant is added to improve the cleaning properties of the polish by holding the abrasives in suspension. A lubricator and moisture retainer prevents the moisture of the system from evaporating due to the heat of friction. Color and fragrance may be added for aesthetics.

The polishing compounds according to the present invention can be applied the same way as conventional polishing compounds, although the results are far superior to any of the prior art compounds presently available. The presently preferred method of application for removing scratches from airplane windows is to apply the polishing compounds by means of conventional hand-held buffing or polishing machines, such as rotary, orbital, or oscillating polishing machines, using an open-cell polyester buffing pad. For lighter scratches as in watch crystals, compact discs, video laser discs, picture discs, or CD-ROM or RAM, it is preferable to apply the compounds by hand with a soft open-cell polyester foam buffing pad or a soft cotton cloth using a reciprocating, rather than a circular, motion. Finally, although it is not necessary to use expensive robotic machines to achieve the best results, the compounds of the present invention are compatible with existing polishing systems presently used to clean aircraft windows (like robotic systems) but yield better results.

It should be understood that almost any type of buffing cloth will work with the compounds of the present invention including the aforementioned open-cell polyester material and cotton pads. Fleece wool linen, open-cell polyurethane, rigid polyurethane, glass wool, and most other natural and synthetic materials work well. The only restraints are that the buffing pad be sufficiently durable to withstand the mechanical forces of the buffing process, that its stiffness be commensurate with the difficulty of the job in question, and that its component materials not be so hard that they will scratch the plastic surface.

The polishing compounds according to the present invention are effective in removing scratches from plastic surfaces without having to remove much of the plastic surface, if any.

In some cases, where there are larger scratches, a polishing compound with a larger mesh size of polishing abrasives is used during a first step. Thereafter, polishing compounds containing successively smaller polishing abrasives are applied thereafter to yield a clear plastic surface. The buffing pad may be made from open-cell polyester or polyurethane, or any other appropriate material depending on the surface being treated. The main criterion is that the rigidity and durability of the pad be proportionate to the magnitude of the scratches and imperfections.

For smaller scratches, polishing compounds which contain finer gauge polishing abrasive particles are used initially, requiring fewer successive steps. Finally, for very fine scratches, hazing or surface yellowing, it is typical to use polishes with very fine polishing abrasives in only one or two steps. In addition, it is usually preferable to apply these finer abrasive compounds with softer buffing pads or cloths.

After the compounds of the present invention have restored the plastic surface, any residual compound is removed by wiping with a clean cloth, preferably wettened with an antistatic spray. For areas where large amounts of polish have built up, such as in corners, excess polish can be removed by using a damp cloth, or by spraying the surface with water and then wiping with a clean, dry cloth. Using solvents for this purpose should often be avoided since many solvents can react with and haze the plastic surface, thus reversing whatever benefit was obtained by using the surface renewal polishing compounds of the present invention.

DETAILED DESCRIPTION OF THE PREFERRED EMBODIMENTS

The present invention relates to novel polishing compounds and methods for removing scratches, hazing, yellowing, and other imperfections from plastic surfaces. The polishing compounds preferably contain polishing abrasives, water, and a blend of suspension agents. The polishing compounds can also contain a surfactant, a lubricant, and an emulsifier which helps to retain moisture in the compound and provides stability of the mixture. Depending on the application for which the invention is used, the polishing compounds preferably contain varying sizes of abrasives suspended in the water.

The polishing compounds of the present invention appear to work on the principles of buffing and polishing. Polishing is an abrading operation usually employed for removal or smoothing out of grinding lines, scratches, pits, tool marks and certain other surface defects that adversely affect the appearance or function of a surface. In the present application the term polishing will generally be defined as a refurbishing of plastics such that the original optical clarity or lack of distortion is regained. The process removes material and to a slight degree is believed to cause some plastic reworking on the surface. With the polishing compounds of the present invention, polishing occurs without any significant removal of material. This polishing step is followed by buffing unless the desired finish is smooth enough for the intended purpose.

Buffing is a process for producing smooth, reflective, scratch-free surfaces by bringing them into contact with a revolving foam buffing wheel treated with an appropriate compound. The action of the wheel either cuts or flows the material thus removing minor defects in the surface and imparting a smooth, lustrous finish. Buffing serves to complete the process and produce a scratch-free lustrous condition.

Most buffing compounds consist of a fine abrasive that is suspended in a carrier formulation. The abrasive acts to cut the surface while the carrier provides lubrication and prevents overheating of the work. Binders (carriers) must not chemically damage the surface but they must bind the abrasive to the face of the wheel. The buffing action can be altered by changing the particle size of the abrasive or the degree of fluidity of the carrier. In other words, one can achieve a greater degree of cutting action by either using larger particle size abrasive or increasing the binding strength of the carrier material (viscosity).

Buffing also may result in a burnishing effect which leaves the entire surface largely intact without significant loss of the material. In burnishing the surface of the material is flowed by pressure, speed and heat of the buffer in combination with the hardness of the abrasive. Burnishing is particularly important on soft materials or where one does not want to lose any of the surface of the piece being polished.

When used on large surfaces such as plastic windows having significant scratches, the polishing compounds are preferably applied using a conventional hand-held buffing or polishing machine having fixed or variable speeds, such as a rotary, orbital, or oscillating polishing machine, and an appropriate pad.

More badly damaged plastic surfaces generally require the use of polishing compounds that have larger sized abrasive particles. Thereafter, in order to restore the plastic surface to a finer finish, it is often preferable to apply polishes containing successively smaller sized polishing abrasives. It is generally preferred that a stiffer pad be used to polish deeper scratches, and a softer pad be used in finishing the repair with polishing compositions containing smaller sized polishing abrasives.

Although ordinary buffing or polishing machines, such as hand-held rotary buffing machines, yield superior results, the compounds of the present invention are also compatible with any of the expensive robotic polishing systems presently employed in the airline industry. The difference is that the polishing compounds of the present invention yield superior results.

Tests have shown that the polishing materials and methods according to the present invention do not strip away appreciable amounts of plastic, while nevertheless being able to eliminate scratches that once penetrated below the plastic surface. The final result is that there is no significant optical distortion of the plastic object or window being treated.

The polishing compounds according to the presently preferred embodiment of the present invention comprise the following elements: a blend of at least two suspension agents, one suspension agent having constant viscosity and a second suspension agent having a thixotropic quality; abrasives; a surfactant; and a lubricant. Color or fragrance can be added if desired.

In order for the polishing material to be dispensable, it must be thin enough to flow. In plain water, the material would immediately sink to the bottom of the container. Further, the product must be thick enough such that it does not spin out from under the buffer pad during polishing. The suspension agents are useful for holding the abrasives in suspension. A combination of at least two suspension agents has been found to be optimal. First, using a suspension agent having a thixotropic property, which means that as pressure is applied to the material the viscosity is temporarily reduced so that the material will flow, and when the material is allowed to stand, it returns to its thicker state, allows for a polishing material which can become thin enough to be dispensable. However, the constant pressure applied by a buffer pad during polishing would cause the thixotropic material to thin out to the point that it spins out from under the buffer pad and therefore becomes useless.

This problem is solved by the addition of a second suspension agent which has constant viscosity. The constant viscosity keeps the product in a thicker state so that it will not spin out from under the buffer pad during use. With the two suspension agents together, the material can become thin enough to be dispensed yet stay thick enough to be used in polishing. The viscosity can be adjusted from a pourable liquid to a stiff gel through the mixture of different quantities of the two suspension agents.

The presently preferred thixotropic suspension agent is magnesium aluminum silicate and the preferred suspension agent with constant viscosity is carboxymethyl cellulose. It is preferred that magnesium aluminum silicate be provided within a broad range of about 26% to about 33%, and preferably at about 30%. It is preferred that carboxymethyl cellulose be provided within a broad range of about 0.5% to about 15% and preferably at about 1.0%. The magnesium aluminum silicate can be obtained, for example, from Union Carbide Corporation of Houston, Tex., while the carboxymethyl cellulose can be obtained, for example, from Aqualon Company of Wilmington, Del. Other suspension agents having similar qualities may also be used within the scope of the present invention.

Further elements present in the polishing compounds of the present invention are the abrasives. A blend of abrasives having different sizes of abrasive particles is presently preferred. Relatively large particles are useful for eliminating deep scratches and weathered haziness. It is preferred that relatively soft abrasive materials be used when using large particles so that the large particles will break down to smaller particles as one polishes with them. Such smaller particles are useful for effecting continued repair as the scratches become smaller and smaller. Use of large, hard particles can actually cause scratching if used too long.

Many types of abrasive material may be used. Presently preferred abrasives include aluminum silicate, diatomaceous silica, alumina, and zirconia, and more specifically celite diatomaceous silica, boehmite alumina, and zirconia. An example of aluminum silicate is Kaopolite SF provided by Kaopolite, Inc. in Union, N.J. An example of diatomaceous silica is Snow Floss provided by Celite Corporation in Lompoc, Calif. An example of boehmite alumina is Catapal D provided by Vista in Houston, Tex. Zirconia can be obtained, for example, from Mitsui Chemical of San Francisco, Calif.

In the presently preferred embodiment, the abrasives form about 18% to about 27% of the total polishing composition (w/w), with a more preferred range of about 21.5% to about 24.5%, and a most preferred value of about 23%.

The polishing compound of the present invention further comprises a surfactant. The surfactant improves the cleaning properties of the polish by holding dirt and grease on the surface being repaired in suspension. The surfactant also helps to solubilize certain ingredients in the system like fragrance and antistatic agents. The surfactant also provides a lubrication function for the system. The surfactant helps keep the abrasive on the buffer pad and aids in the slippage of the buffer over the polishing surface. It is preferred that the surfactant be provided in a broad range from about 2.0% to about 3.0%, and most preferably at about 2.5%.

The surfactant presently preferred is an ethylene oxide/propylene oxide copolymer. One example is Tergitol Minifoam 2X as provided by Union Carbide. It is a nonionic detergent which gives greater flexibility in adding other surfactants when necessary. Nevertheless, it should be understood that any nonionic surfactant, and many cationic or anionic surfactants would also be suitable in the practice of the present invention.

The polishing compound of the present invention further comprises a lubricant and moisture retainer. In the presently preferred embodiment, propylene glycol is used to prevent the moisture of the system from evaporating due to the heat of friction. Glycerine may also be added but is more expensive. Without a lubricant and moisture retainer, the polishing residue would tend to be dry and more difficult to remove after the repair. An excessive powder or dust could be generated which could cause a coating of dust to deposit on the plastic surfaces. This coating would tend to adhere to the surface by operation of static electricity so that removal might well result in formation of new scratches. It is preferred that the lubricant be provided in a broad range from about 3.5% to about 6.5%, and most preferably at about 5%.

Further elements of the polishing compound of the present invention comprise color and fragrance. These elements may be added, if desired, for aesthetics or for differentiating the various abrasive blends. One example of fragrance is Coconut Fragrance 98764 provided by Drom International, Inc. of Towaco, N.J. One example of color is 1-(3-chlorallyl)-3,5,7,-triaza-1-azonia-adamantane chloride such as Dowicil 75 provided by Dow Chemical of Midland, Mich.

Finally, water is a component of the polishing compounds according to the present invention. It is preferable to use deionized water.

One important aspect of the present invention is that the formulas have been developed without use of any unnecessary volatile organic hydrocarbons (hereinafter "VOC"). This development has been made in response to various state laws or regulations which have put a limit on VOC's. This limitation or elimination of VOC's also eliminates the possibility of having solvents cause expansion or deterioration of rubber seals around windows repaired using a polishing composition.

EXAMPLES OF SPECIFIC FORMULAS

Below are specific examples of compositions and methods which have been created according to the present invention.

EXAMPLE 1

A medium abrasive polishing composition in accordance with the present invention was prepared with the following formulation:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate | 15.0 |
| Celite Diatomaceous Silica | 8.0 |
| Ethylene Oxide/Propylene Oxide Block Copolymer | 2.5 |
| Fragrance 98764 | 0.2 |
| 1-(3-chloroallyl)-3,5,7-Triaza-1-azonia adamantane Chloride | 0.2 |
| Acid Blue 9 (1.0%) | 0.5 |

Sufficient deionized water was added to bring the total volume to 100 percent (w/w). This formulation exhibited a creamy viscous lotion consistency, and was cream in color. In this and other examples coconut fragrance and coloring agent were added for aesthetic purposes only, and it should be understood that fragrance and/or color could be omitted or substituted without altering the efficiency of the polishing composition.

This formulation has a wide variety of uses for removing scratches from plastic surfaces. It is a presently preferred composition for treatment of an audio compact disc, for example, having scratches which are deep enough to cause skipping or to cause the disc to be unreadable by the laser.

A medium abrasive formula in accordance with this example would also be useful for repairing plastic material such as plastic windows, plastic or acrylic furniture, plastic shields on face masks, light bars on police vehicles, ski trams or gondolas, the faces of advertising signs, and many other applications.

Although the formulation set forth above is the presently preferred formulation, it should be understood that various alterations may be made without departing from the broader teachings of the present invention. Although it is preferred that the total abrasives content be about 23%, a broader range of abrasive content is about 18% to about 27% with a more preferred range being about 21.5% to about 24.5%. In formulating a medium abrasive formulation of the type set forth in this example, it is to be understood that variations in the ratio of aluminum silicate to celite could be made. Alterations may also be made in the amounts of the remaining constituents as required to maintain their function.

EXAMPLE 2

A light abrasive polishing composition in accordance with the present invention was prepared with the following formulation:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate | 23.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

Sufficient deionized water was added to bring the total volume to 100 percent (w/w). The pH of this formulation was 7.0+/−0.5 and it was a viscous creamy bluish lotion.

This light abrasive formulation has a variety of uses, but is particularly preferred as a final treatment for compact discs first treated with the composition of Example 1. It would also be useful for buffing or removing minor scratches, hazing and discoloration from other plastics, particularly as a final polishing composition for repairing plastic materials where a medium of heavy abrasive formulation was initially used to commence repair.

It is to be understood that various modifications may be made in the formulation of this example without departing from the teachings of the present invention. Although it is preferred that the total abrasives content be in the form of aluminum silicate in the amount of 23%, it should be understood that other abrasives may be used with aluminum silicate. It is preferred that the aluminum silicate content be in a broad range of about 18% to 27%, with a more preferred range of about 21.5% to about 24.5%.

EXAMPLE 3

A medium-heavy abrasive polishing composition was prepared with the following formulation:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate | 8.0 |
| Celite Diatomaceous Silica | 7.0 |
| Boehmite Alumina | 8.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

Sufficient deionized water was added to bring the total volume to 100 percent.

This formulation is suitable for many uses, such as those described in Example 1. As with Example 1, it is preferred that total abrasives be provided in the amount of 23%, although a broad range of abrasives may be between about 18% to about 27%, and a more preferred range of about 21.5% to about 24.5%.

The boehmite aluminum has the advantage of being relatively soft. It will break into smaller fragments during use, assisting in repair of the increasingly small scratches which exist during the course of repair.

EXAMPLE 4

A heavy abrasive polishing composition was prepared using the following formulation:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate (150 microns average size) | 18.0 |
| Fused Silica (8.8 microns average) | 3.0 |
| Boehmite Alumina (60 microns average) | 2.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

Deionized water in a quantity sufficient to make 100%.

The fused silica is a heat-treated silica product, such as that sold under the trademark Siltex 44 by Kaopolite. This heavy formulation is useful for quick removal of scratches from most of the plastic materials of Example 1, although it would not likely be used with compact discs or the like. It is likely that a medium formulation such as set forth in Example 1 would be used to complete the repair after an initial treatment with this formulation.

As in the preceding examples, the preferred content of abrasives is 23%. The total abrasives content may be altered, however, as described in Examples 1-3.

EXAMPLE 5

An alternative light abrasive polishing composition has the following formulation:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate | 11.5 |
| Zirconia (2-4 microns average) | 11.5 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

Deionized water is added in a quantity sufficient to make 100% of the composition.

This example includes zirconia (zirconium oxide) as an abrasive. This is a hard material and hence should be used with care.

Alterations in the amounts of the various constituents and abrasives may be made as suggested in Examples 1-4.

EXAMPLE 6

Another alternative light abrasive formulation, is formulated as follows:

|  | % W/W |
| --- | --- |
| Magnesium Aluminum Silicate (5%) | 30.0 |
| Propylene Glycol | 5.0 |
| Carboxymethyl Cellulose | 1.0 |
| Zirconia (2-4 microns average) | 23.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

The light abrasive formulation identified in this example would be useful for the same types of applications as other light abrasive formulations set forth herein, and is particularly useful for treating scratches on aircraft windows for star crazing, and the like. Once again, deionized water was added in a quantity sufficient to make 100% of the formulation. In this formulation a preferred broad range of zirconia is 18% to 27% with a more preferred range being 21.5% to about 24.5%.

EXAMPLE 7

An alternative heavy abrasive polishing composition for removing deep scratches, haze, and discoloration from plastic surfaces is formulated as follows:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum silicate | 6.0 |
| Celite Diatomaceous Silica | 6.0 |
| Boehmite Alumina | 6.0 |
| Zirconia (40-60 microns average) | 6.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

Deionized water in a quantity sufficient to make 100%.

EXAMPLE 8

Another alternative heavy abrasive polishing composition is formulated as follows:

|  | % W/W |
| --- | --- |
| Magnesium Aluminum Silicate (5%) | 30.0 |
| Propylene Glycol | 5.0 |
| Carboxymethyl Cellulose | 1.0 |
| Aluminum Silicate | 8.0 |
| Celite Diatomaceous Silica | 7.0 |
| Zirconia (40-60 microns average) | 8.0 |
| Ethylene Oxide/Propylene Oxide Block Copolymer | 2.5 |
| Fragrance 98764 | 0.2 |
| 1-(3-chloroallyl)-3,5,7-Triaza-1-azonia-adamantane chloride | 0.2 |

In this formulation, boehmite alumina was omitted as a constituent, while the preferred amounts of aluminum silicate and boehmite alumina were increased above the preferred level in Example 6. When using this formulation, it is preferred that both aluminum silicate and boehmite aluminum be provided in a broad range of about 5.5% to 10.5% and a preferred range of about 7% to 9%. The remaining constituents should preferably be provided within the ranges taught in Example 5.

EXAMPLE 9

An alternative medium abrasive polishing composition is formulated to include zirconia (12–16 microns average).

EXAMPLE 10

A medium abrasive formulation based on the formulation of Example 4 is made by substituting aluminum silicate having an average particle size of about 75 microns for the larger particles used in Example 4.

EXAMPLE 11

The light, medium, and heavy abrasive formulations of Examples 1–10 are useful for removing scratches from a variety of plastic materials. For relatively deep scratches or heavily scratched surfaces, it is generally preferred to begin with a heavy abrasive formula and then use a medium abrasive formula and/or a light abrasive formula to complete the repair. Copending Application Ser. No. 07/993,729 entitled "Methods and Apparatus for Removing Scratches from Plastic Surfaces" filed Dec. 17, 1992, now U.S. Pat. No. 5,337,524, (incorporated herein by reference) discloses methods and apparatus useful in removing scratches in connection with polishing formulations disclosed herein.

EXAMPLE 12

Preparation Procedure

The procedure for preparing each of the formulas comprise the following steps:

1. Prepare a dispersion solution with the Magnesium Aluminum Silicate.
2. Charge a mixing vessel with the formula quantity of water.
3. Add Dowicil to the formula quantity of water and mix until clear.
4. With lightening mixer agitation, disperse carboxymethyl cellulose in the water until the solution is uniform and clear.
5. Add the Magnesium Alumina Silicate dispersion solution and the ethylene oxide/propylene oxide block copolymer and mix until uniform.
6. Add the abrasives and mix until homogenous, such that there are no clumps of abrasive present.
7. Add fragrance and color where desired. Mix until uniform.

The propylene glycol, being a polar solvent, can be added at any time as the lubricant, It is recommended, however, that the propylene glycol be added to the water along with the surfactant.

This invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composition for removing scratches and other imperfections from plastic surfaces comprising:
   a. a blend of different suspension agents, at least one suspension agent having a thixotropic characteristic, and at least one suspension agent having constant viscosity;
   b. solid abrasive material within a range from about 18% to about 27% by weight;
   c. a surfactant;
   d. a lubricant; and
   e. water.

2. A composition for removing scratches and other imperfections from plastic surfaces as defined in claim 1, wherein the suspension agent having a thixotropic characteristic comprises magnesium aluminum silicate.

3. A composition for removing scratches and other imperfections from plastic surfaces as defined in claim 2, wherein the magnesium aluminum silicate is included in an amount of about 25% to about 33% by weight.

4. A composition for removing scratches and other imperfections from plastic surfaces as defined in claim 1, wherein the suspension agent having constant viscosity comprises carboxymethyl cellulose.

5. A composition for removing scratches and other imperfections from plastic surfaces as defined in claim 4, wherein the carboxymethyl cellulose is included in an amount in a range from between about 0.5% to about 1.5% by weight.

6. A composition for removing scratches and other imperfections from plastic surfaces as defined in claim 1, wherein the lubricant comprises propylene glycol.

7. A composition for removing scratches and other imperfections from plastic surfaces as defined in claim 1, wherein the water is deionized.

8. A composition for removing scratches and other imperfections from plastic surfaces as defined in claim 1, wherein the solid abrasive material is included in an amount of about 23% by weight.

9. A composition for removing scratches and other imperfections from plastic surfaces as defined in claim 1, wherein the solid abrasive material comprises diatomaceous silica.

10. A composition for removing scratches and other imperfections from plastic surfaces as defined in claim 1, wherein the solid abrasive material comprises alumina.

11. A composition for removing scratches and other imperfections from plastic surfaces as defined in claim 1, wherein the solid abrasive material comprises aluminum silicate.

12. A composition for removing scratches and other imperfections from plastic surfaces as defined in claim 1, wherein the solid abrasive material comprises zirconia.

13. A composition for removing scratches and other imperfections from plastic surfaces as defined in claim 1, wherein the solid abrasive material comprises a blend of aluminum silicate, diatomaceous silica, and alumina.

14. A composition for removing scratches and other imperfections from plastic surfaces as defined in claim 1, wherein the solid abrasive material comprises a blend of aluminum silicate and diatomaceous silica.

15. A composition for removing scratches and other imperfections from plastic surfaces as defined in claim 1, wherein the solid abrasive material is a blend of aluminum silicate, diatomaceous silica, alumina and zirconia.

16. A composition for removing scratches and other imperfections from plastic surfaces as defined in claim 1, wherein the surfactant comprises a copolymer of ethylene oxide and propylene oxide.

17. A composition for removing scratches and other imperfections from plastic surfaces as defined in claim 1, wherein the surfactant is a nonionic detergent.

18. A composition for removing scratches and other imperfections from plastic surfaces as defined in claim 1, further comprising a fragrance added into the composition.

19. A composition for removing scratches and other imperfections from plastic surfaces as defined in claim 1, further comprising a color additive.

20. A composition for removing scratches and other imperfections from plastic surfaces comprising:
   a. a blend of different suspension agents, at least one suspension agent having a thixotropic characteristic, and at least one suspension agent having constant viscosity;
   b. a blend of different abrasives, each abrasive having a different size of particles;
   c. a surfactant;
   d. a lubricant; and
   e. water.

21. A composition for removing scratches and other imperfections from plastic surfaces as defined in claim 20, wherein the surfactant is a copolymer of ethylene oxide and propylene oxide.

22. A composition for removing scratches and other imperfections from plastic surfaces as defined in claim 20, wherein the surfactant is a nonionic detergent.

23. A composition for removing scratches and other imperfections from plastic surfaces as defined in claim 20, wherein the blend of different abrasives comprises alumina, diatomaceous silica, and aluminum silicate.

24. A composition for removing scratches and other imperfections from plastic surfaces as defined in claim 20, wherein the blend of different abrasives comprises diatomaceous silica and aluminum silicate.

25. A composition for removing scratches and other imperfections from plastic surfaces as defined in claim 20, wherein the blend of different suspension agents comprise carboxymethyl cellulose and magnesium aluminum silicate.

26. A composition for removing scratches and other imperfections from plastic surfaces as defined in claim 20, further comprising a fragrance added to the composition.

27. A composition for removing scratches and other imperfections from plastic surfaces as defined in claim 20, further comprising a color additive.

28. A method for removing scratches and other imperfections from plastic surfaces comprising the steps of:
   a. applying to a pad a polishing composition comprising:
      (1) a blend of different suspension agents, at least one suspension agent having a thixotropic characteristic, and at least one suspension agent having constant viscosity;
      (2) a solid abrasive material within a range from about 18% to about 27% by weight;
      (3) a surfactant;
      (4) a lubricant; and
      (5) water; and
   b. using said pad and said polishing composition to remove scratches and other imperfections from a plastic surface.

29. A composition for removing scratches and other imperfections from plastic surfaces comprising:
   a. magnesium aluminum silicate in an amount within a range of about 26% to about 33% by weight;
   b. carboxymethyl cellulose in an amount within a range of about 0.5% and about 1.5% by weight;
   c. solid abrasive material within a range from about 18% to about 27% by weight;
   d. a surfactant;
   e. a lubricant; and
   f. water.

30. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 15% of the composition by weight and diatomaceous silica in an amount of about 8% of the composition by weight.

31. A composition as defined in claim 30, wherein the surfactant comprises a block copolymer of ethylene oxide and propylene oxide in an amount of about 2.5% of the composition by weight; and the lubricant comprises propylene glycol in an amount of about 5% by weight.

32. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 23% of the composition by weight.

33. A composition as defined in claim 32, wherein the surfactant comprises a block copolymer of ethylene oxide and propylene oxide in an amount of about 2.5% of the composition by weight; and the lubricant comprises propylene glycol in an amount of about 5% by weight.

34. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 8% by weight, diatomaceous silica in an amount of about 7% by weight, and boehmite alumina in an amount of about 8% by weight.

35. A composition as defined in claim 34, wherein the surfactant comprises a block copolymer of ethylene oxide and propylene oxide in an amount of about 2.5% of the composition by weight; and the lubricant comprises propylene glycol in an amount of about 5% by weight.

36. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate having an average size of 150 microns in an amount of about 18% by weight, fused silica having an average size of 8.8 microns in an amount of about 3% by weight, and boehmite alumina having an average size of 60 microns in an amount of about 2% by weight.

37. A composition as defined in claim 36, wherein the surfactant comprises a block copolymer of ethylene oxide and propylene oxide in an amount of about 2.5% of the composition by weight; and the lubricant comprises propylene glycol in an amount of about 5% by weight.

38. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 11.5% by weight, and zirconia having an average particle size of 2 to 4 microns in an amount of about 11.5% by weight.

39. A composition as defined in claim 38, wherein the surfactant comprises a block copolymer of ethylene oxide and propylene oxide in an amount of about 2.5% of the composition by weight; and the lubricant comprises propylene glycol in an amount of about 5% by weight.

40. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises zirconia having an average particle size of 2 to 4 microns in an amount of about 23% by weight.

41. A composition as defined in claim 40, wherein the surfactant comprises a block copolymer of ethylene oxide and propylene oxide in an amount of about 2.5% of the composition by weight; and the lubricant comprises propylene glycol in an amount of about 5% by weight.

42. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 6% by weight, diatomaceous silica in an amount of about 6% by weight, boehmite alumina in an amount of about 6% by weight, and zirconia having an average particle size of 40 to 60 microns in an amount of about 6% by weight.

43. A composition as defined in claim 42, wherein the surfactant comprises a block copolymer of ethylene oxide and propylene oxide in an amount of about 2.5% of the composition by weight; and the lubricant comprises propylene glycol in an amount of about 5% by weight.

44. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate in an amount of about 8% by weight, diatomaceous silica in an amount of about 7% by weight, and zirconia having an average particle size of 40 to 60 microns in an amount of about 8% by weight.

45. A composition as defined in claim 44, wherein the surfactant comprises a block copolymer of ethylene oxide and propylene oxide in an amount of about 2.5% of the composition by weight; and the lubricant comprises propylene glycol in an amount of about 5% by weight.

46. A composition as defined in claim 30, wherein the abrasive material further includes zirconia having an average particle size of 12 to 16 microns.

47. A composition for removing scratches and other imperfections from plastic surfaces as defined in claim 29, wherein the magnesium aluminum silicate comprises about 30% of the composition by weight; the carboxymethyl cellulose comprises about 1% of the composition by weight; and the solid abrasive material comprises aluminum silicate having an average size of about 75 microns in an amount of about 18% by weight, fused silica having an average size of 8.8 microns in an amount of about 3% by weight, and boehmite alumina having an average size of 60 microns in an amount of about 2% by weight.

48. A composition as defined in claim 47, wherein the surfactant comprises a block copolymer of ethylene oxide and propylene oxide in an amount of about 2.5% of the composition by weight; and the lubricant comprises propylene glycol in an amount of about 5% by weight.

* * * * *

UNITED STATES PATENT AND TRADEMARK OFFICE
CERTIFICATE OF CORRECTION

PATENT NO. : 5,407,615
DATED : April 18, 1995
INVENTOR(S) : WILLIAM C. NORVILLE

It is certified that error appears in the above-indentified patent and that said Letters Patent is hereby corrected as shown below:

Column 3, line 61, "golfer's" should be --golfers--
Column 5, line 20, after "wool" insert --,--
Column 6, line 49, after "burnishing" insert --,--
Column 7, line 59, "15%" should be --1.5%--
Column 11, line 25, after "water" insert --was used--
Column 13, line 32, "comprise" should be --comprises--
Column 13, line 50, "lubricant," should be --lubricant.--

Signed and Sealed this

Twenty-fourth Day of October, 1995

Attest:

BRUCE LEHMAN

Attesting Officer

Commissioner of Patents and Trademarks